United States Patent [19]
Vermeulen et al.
[11] Patent Number: 4,992,130
[45] Date of Patent: Feb. 12, 1991

[54] PROCESS FOR THE PRODUCTION OF A LAMINATE

[75] Inventors: Leon L. Vermeulen, Herenthout; Robert S. Pauwels, Edegem, both of Belgium
[73] Assignee: Agfa-Gevaert, Mortsel, Belgium

[21] Appl. No.: 372,846
[22] Filed: Jun. 29, 1989
[30] Foreign Application Priority Data
Jul. 7, 1988 [BE] Belgium ..................... EP88201426.9
[51] Int. Cl.5 ..................... C09J 5/02
[52] U.S. Cl. ..................... 156/307.5; 40/626; 40/630; 156/310; 156/331.1; 428/916; 430/12; 430/14; 430/18; 524/607; 524/608; 524/612
[58] Field of Search ..................... 156/307.5, 331.1, 310; 40/626, 630; 430/13, 18, 14; 524/608, 612, 607; 428/916

[56] References Cited

U.S. PATENT DOCUMENTS 3,520,758 7/1970 Wiest ..................... 430/14
4,054,542 10/1977 Buckman et al. ..................... 156/330.9
4,563,376 1/1986 Hammer et al. ..................... 426/105

*Primary Examiner*—John J. Gallagher
*Attorney, Agent, or Firm*—William J. Daniel

[57] ABSTRACT

A laminate is produced by bonding together two hydrophobic thermoplastic resin sheets at least one of which carries at least one hydrophilic colloid layer containing a photograph and/or other information on its inner side, by the steps comprising:

(1) treating such information-bearing hydrophilic colloid layer with an aqueous composition containing a self-cross-linkable reaction product of:
   (i) an epihalohydrin or an Alpha-dihalohydrin,
   (ii) a water-soluble polyamide, and
   (iii) a water-soluble polyamine containing at least two nitrogen atoms separated by at least three carbon atoms and optionally also by at least one oxygen or sulphur atom and having at least two hydrogen atoms attached to different nitrogen atoms
(2) drying thus treated layer, and
(3) applying heat and pressure to bond the hydrophobic resin sheets together with such hydrophilic colloid layer sandwiched there-between.

11 Claims, No Drawings

PROCESS FOR THE PRODUCTION OF A LAMINATE

The present invention relates to a process for the production of a laminated document such as an identification card (I.D. card).

Laminated documents such as I.D. cards essentially comprise a card or document usually containing information relating to the bearer. Generally, a portion of the information is in the form of a photograph of the bearer. I.D. cards are used e.g. to establish a person's authorization to conduct certain activities (driver's license) or the authorization to have access to certain areas (employee I.D. cards) or to engage in credit transactions (I.D. credit cards).

In view of the widespread use of I.D. cards, especially in commercial transactions, such as cashing checks, credit purchases, etc., it is important that the information contained in the I.D. card cannot be altered and that the I.D. card gives maximum protection against counterfeiting by alteration and/or replacement of its data and photograph.

Normally the information in the I.D. card is protected by lamination between plastic sheets serving as support and covering sheet.

Many attempts have been made to obtain perfect seal between the sheets that is so strong that it resists separation, e.g. by peeling with a razor blade and/or wet treatment. The use of a pouch structure wherein only the border parts of the plastic sheets are sealed is not sufficiently tamper-proof since after cutting around the edge of the original card the pouch can be opened and some information such as the photograph can be removed and replaced by other information before resealing the pouch.

Ideally, to avoid said shortcoming a "security seal" is established between the information-bearing element of the card or document and the plastic. As described in U.S. Pat. No. 4,151,666 the purpose of a security seal is that if one should succeed in the removal of the plastic cover sheet a substantial portion of the information containing part of the document is also removed so that a visibly damaged part remains adhered to the support. In this way protection against surreptitious substitution of information is obtained discouraging alteration of sealed documents.

Since in most cases a photograph is used that is formed in one or more hydrophilic colloid layers as are known from silver halide photography a good bonding of each such colloid said layer to the plastic support sheet and plastic covering sheet is essential so that any opening of the seal results in damage of the photograph and other information.

It is an object of the present invention to provide a process for the production of a laminated document such as an identification card wherein at least one hydrophilic colloid layer containing information is sealed and bonded firmly to hydrophobic covering and supporting plastic sheets.

Other objects and advantages of the present invention will appear from the further description.

In accordance with the present invention a process is provided for laminating two hydrophobic thermoplastic resin sheets at least one of which carries at least one hydrophilic colloid layer containing a photograph and/or other information on its inner side, said process comprising the following steps:

(1) treating such hydrophilic colloid layer with an aqueous composition containing a self-cross-linkable reaction product of:
   (i) an epihalohydrin or an Alpha-dihalohydrin,
   (ii) a water-soluble polyamide, and
   (iii) a water-soluble polyamine containing at least two nitrogen atoms separated by at least three carbon atoms and optionally also by at least one oxygen or sulphur atom and having at least two hydrogen atoms attached to different nitrogen atoms,
(2) drying the thus treated layer, and
(3) applying heat and pressure to bond the hydrophobic resin sheets together with such hydrophilic colloid layer sandwiched between.

The preparation of the above defined self-cross-linkable reaction product is given in GB Pat. No. 1 269 381, wherein said product is described for improving the wet strength of paper.

Examples of epihalohydrins and Alpha-dihalohydrins for application in the preparation of said self-cross-linking reaction product are epibromohydrin, Alpha-dibromohydrin, epichlorohydrin and Alpha-dichlorohydrin. Those self-cross-linking reaction products are preferred which have been prepared with the use of 0.5–1.5 mole, especially 0.8–1.2 mole of epihalohydrins or Alpha-dihalohydrins per basic amino group in the polyamides (ii) and polyamines (iii).

Examples of water-soluble polyamides (ii) useful in the preparation of said self-cross-linking reaction product are: reaction products of saturated aliphatic $C_4$–$C_{10}$-dicarboxylic acids, such as succinic acid, glutaric acid, adipic acid, diglycollic acid and sebacic acid or with their functional derivatives, such as anhydrides or esters, with aliphatic polyamines containing at least two primary amino groups and at least one secondary or tertiary amino group; examples of such amines are for instance methyl-bis-(3-amino-propyl)-amine, ethyl-bis-(3-amino-propyl)-amine, 2-hydroxyethyl-bis(3-amino-propyl)amine, N-(3-amino-propyl)-tetramethylene-diamine and N,N'-bis-(3-aminopropyl)-tetramethylene-diamine, but especially polyalkylene polyamines corresponding to the following general formula:

$$H\overset{R^6}{\overset{|}{N}}-[A-\overset{R^7}{\overset{|}{N}}]_k-H$$

wherein:

A denotes a $C_2$–$C_8$-alkylene residue, $R^6$ and $R^7$ independently of one another stand for hydrogen or a $C_1$–$C_{10}$-alkyl residue optionally substituted by an amino or hydroxy group, and k is a number from 2-5.

Examples of said polyalkylene polyamines are di-propylene-(1,2)-triamine, bis(3-amino-propyl)-amine, tri-propylene-(1,2)-tetramine and especially diethylene-triamine and tetra-ethylene-pentamine.

Examples of water-soluble polyamines (iii) useful in the preparation of said self-cross-linking reaction product are: 1,3-bis-(2-amino-ethylamino)-propane, 3-(3-diethylamino-propylamino)-propylamine, bis,-(2-amino-ethyl)-ether, 2,2'-bis-methylamino-diethylether,2,2'-bis-(2-amino-ethylamino)-diethyl ether, bis-(3-amino-propyl)-ether,bis(3-aminopropyl) -sulphide, 1,6-bis-(2-amino-ethylamino)-hexane, 1,6-bis-(3-amino-propylamino) -hexane, bis-(6-amino-n-hexyl)-amine and 1,3-diamino-butane and especially polyalkylene polyamines corresponding to the following general formula:

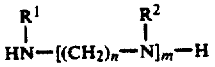

wherein:

$R^1$ and $R^2$ independently of one another denote hydrogen or a $C_1$–$C_4$-alkyl residue optionally substituted by an amino or a hydroxy group, m is a number from 1–8, preferably 2–4, and n is a number from 3–10, preferably 3–6.

Examples of such polyalkylene polyamines are 1,3-diamino-propane, 1-amino-3-methylamino-propane, 1,3-bis-(2-hydroxy-ethylamino)-propane, 1,4-di-amino-butane, 1,4-bis-methylamino-butane, N-(3-amino-propyl)tetramethylene-diamine, N,N'-bis-(3-amino-propyl)-tetramethylene-diamine and especially bis-(3-amino-propyl)-amine and hexamethylene-diamine, Other suitable polyamines correspond to the following general formula:

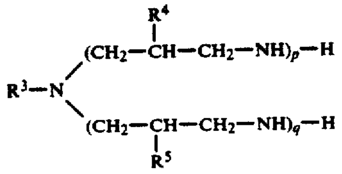

wherein $R^3$ denotes a $C_1$–$C_{18}$-alkyl residue optionally substituted by an amino or a hydroxy group, $R^4$ and $R^5$ stand independently of one another for hydrogen or a methyl group and the sum p+q is a number from 1–20, preferably 2–5.

Examples of said polyamines are: ethyl-bis-(3-amino-propyl)-amine, 2-hydroxy-ethyl-bis-(3-amino-propyl)-amine, n-butyl-bis-(3-amino-propyl)-amine, tris-(3-amino-propyl)-amine and especially methyl-bis-(3-amino-propyl)-amine.

Still other suitable water-soluble cycloaliphatic and araliphatic polyamines are e.g. 1,4-di-amino-cyclohexane, 1-aminomethyl-5-amino-1,3,3-trimethyl-cyclohexane, 1,3-bis-aminomethyl-benzene and benzyl-bis-(3-amino-propyl)-amine.

A preferred self-cross-linking reaction product for use according to the present invention is "reaction product 2" obtained as a 10% by weight solution according to said GB Pat. No. 1 269 381 and which product is called hereinafter reaction product R. In the preparation of said reaction product R a mixture of the polyamide defined as reaction product 1 in said GB-P and methyl-bis-(3-amino-propyl)-amine were reacted with epichlorohydrin.

The treatment as defined in step (1) proceeds preferably with an aqueous composition containing said self-cross-linking reaction product in an amount of 10 g/l to 160 g/l. To avoid premature crosslinking said treatment takes place at room temperature (20° C.) with the treating liquid having a pH lower than 7, e.g. at a pH in the range of 3 to 5.

The lamination by heat and pressure to provide according to the present invention an effective security seal of information contained in a hydrophilic colloid medium between hydrophobic resin sheets is carried out advantageously with a hot platen press or roll laminator known to those skilled in the art. The heating of the laminate assembly takes place preferably in the temperature range of 100° to 150° C. and the pressure applied is preferably in the range of 5 to 20 kg/cm2.

During the lamination a cross-linking reaction of said reaction product in the hydrophilic colloid layer(s) containing the information to be protected takes place.

By virtue of the presence of functional groups in the hydrophilic colloid binder of said hydrophilic colloid layer(s), e.g. especially amino groups, but likewise carboxylic groups, hydroxy groups, and active methylene groups, the hydrophilic binder itself takes part in the cross-linking reaction with the above defined self-cross-linking reaction product of compounds (i), (ii) and (iii) and a very strong adhesion to the hydrophobic protective sheet materials of the laminate is obtained.

According to a preferred embodiment at least one of the hydrophilic colloid layers contained in the laminate is an imagewise exposed and photographically processed (developed and fixed) silver halide emulsion layer or is an image-receiving layer containing a photographic image obtained by the silver complex diffusion transfer reversal process or a dye diffusion transfer process based on silver halide photography.

In the production of a laminate according to the present invention any type of silver halide emulsion layer may be used for the reproduction of information. Information about silver halide emulsion preparation and composition can be found e.g. in Research Disclosure, December, 1978, item 17643.

The composition of silver complex diffusion transfer reversal (DTR-) materials and processing are known e.g. from the book: "Photographic Silver Halide Diffusion Processes" by André Rott and Edith Weyde - Focal Press - London - New York (1972).

A survey of dye diffusion transfer materials is given in Research Disclosure, November, 1976, item 15162 and by Christian C. Van de Sande in Angew. Chem. - Ed. Engl. 22 (1983) n° 3, 191–209.

In a silver halide emulsion layer or an image-receiving layer for silver complex or dye diffusion transfer processing, gelatin is used preferably as hydrophilic colloid binder. Gelatin can, however, be replaced in whole or part by synthetic, semi-synthetic, or natural polymers. Synthetic substitutes for gelatin are e.g. polyvinyl alcohol, poly-N-vinyl pyrrolidone, polyvinyl imidazole, polyvinyl pyrazole, polyacrylamide, polyacrylic acid, and derivatives thereof, in particular copolymers thereof. Natural substitutes for gelatin are e.g. other proteins such as zein, albumin and casein, cellulose, saccharides, starch, and alginates. In general, the semi-synthetic substitutes for gelatin are modified natural products e.g. gelatin derivatives obtained by conversion of gelatin with alkylating or acylating agents or by grafting of polymerizable monomers on gelatin, and cellulose derivatives such as hydroxyalkyl cellulose, carboxymethyl cellulose, phthaloyl cellulose, and cellulose sulphates.

In DTR-image-receiving materials preferably gelatin is used as sole binding agent for its physical development nuclei or in combination with alginic acid derivatives, polyvinyl alcohol, starch and starch derivatives, particularly carboxymethylcellulose or gallactomannans (ref. the above mentioned book of André Rott and Edith Weyde, p. 49). Other organic binding agents of the synthetic type are e.g. poly-N-vinylpyrrolidinone, copolymers of polyvinyl ester and maleic anhydride. As inorganic binding agent colloidal silica has been mentioned. e.g. in U.S. Pat. No. 2,698,237.

In dye diffusion transfer layers suited for use in the production of a laminate according to the present invention a hydrophilic colloid binder, preferably gelatin, is used in conjunction with a mordant for the transferred dyes. If acid dyes are to be mordanted, the dye image-receiving layer contains basic polymeric mordants such as polymers of amino-guanidine derivatives of vinyl methyl ketone as described e.g. in U.S. Pat. No. 2,882,156, and basic polymeric mordants and derivatives, e.g. poly-4-vinylpyridine, the metho-p-toluene sulphonate of poly-2-vinylpyridine and similar compounds described in U.S. Pat. No. 2,484,430, and the compounds described in the published DE-A Nos. 2,009,498 and 2,200,063. Other mordants are long-chain quaternary ammonium or phosphonium compounds or ternary sulphonium compounds, e.g. those described in U.S. Pat. Nos. 3,271,147 and 3,271,148, and cetyltrimethyl-ammonium bromide. Certain metal salts and their hydroxides that form sparingly soluble compounds with the acid dyes may be used too. The dye mordants are dispersed or molecularly divided in one of the usual hydrophilic binders in the image-receiving layer, e.g. in gelatin, polyvinylpyrrolidone or partly or completely hydrolysed cellulose esters.

In U.S. Pat. No. 4,186,014 cationic polymeric mordants are described that are particularly suited for fixing anionic dyes e.g. sulphinic acid salt dyes that are image-wise released by a redox-reaction described e.g. in published EP-A No. 0,004,399 and U.S. Pat. No. 4,232,107.

Preferred cationic polymeric mordants contain glycidyl groups that can react with active hydrogen atoms present in gelatin serving as binding agent. According to United States Patent Specification No. 4,186,014 such polymers can be made by quaternizing a basic polyurethane, polyurea or polyurea-polyurethane with a quaternizing agent capable of introducing glycidyl groups. The following mordant M is a representative thereof:

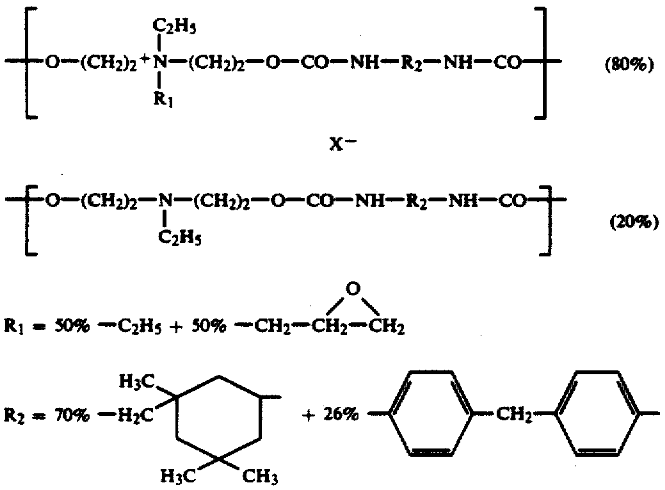

$X^- = 50\%\ C_2H_5SO_4^- + 50\%\ Cl^-$

As described in co-pending EP-A 87201865.0 a particularly useful dye image receiving layer for use in the production of laminates contains a hydrophobic resin support coated with a subbing layer that is coated with an image-receiving layer containing gelatin in combination with a cationic polymeric mordant containing glycidyl groups that can react with active hydrogen atoms of gelatin, wherein the weight ratio of said polymeric mordant to gelatin in said image-receiving layer is between 25:1 to 1:1 and the gelatin is present therein at a coverage of at least 0.1 g per m2, and wherein said subbing layer has been applied from an aqueous composition comprising a polyester-polyurethane wherein isocyanate groups still present in its structure have reacted with an ionomeric compound containing at least one active hydrogen atom and a carboxylate or sulphonate salt group forming an anionic polyester-polyurethane.

The preparation of such anionic polyester-polyurethanes is described in U.S. Pat. Nos. 3,397,989 and 4,388,403.

The quantity of said salt groups is sufficient to make the anionic polyester-polyurethane dispersable in aqueous medium optionally in the presence of a water-miscible solvent.

Preferably the sulfonate and/or carboxylate groups total from 0.5 to 15% by weight with respect to the anionic polyester-polyurethane.

The polyester-polyurethane used as starting compound in the reaction with said ionomeric compound is preferably a polyurethane of an essentially linear polyester compound that has two terminal hydroxyl groups, the polyester having preferably a molecular weight of about 300 to about 20,000.

Preferred anionic polyester-polyurethanes for use as subbing materials in the production of a laminate according to the present invention contain linear polyester structural parts corresponding with a polyester derived from a dicarboxylic acid containing up to 6 carbon atoms and a polyhydric aliphatic alcohol containing up to 6 carbon atoms.

In said subbing layer gelatin may be present in the range of 0% to 25% by weight with respect to the anionic polyester-polyurethane.

An anionic polyester-polyurethane that is particularly suited for use in a subbing layer on a polyvinyl chloride resin support, either or not in combination with gelatin, is called herein "Subbing ingredient S" and is the reaction product of:

(1) the polyester of adipic acid and hexanediol with average molecular weight 840, (23%),
(2) 4,4'-diisocyanato-dicyclohexylmethane (14%),
(3) dimethylolpropionic acid (2%),
(4) trimethylamine (1.5%), wherein the given percentages are by weight.

Subbing ingredient S is used as a dispersion in water containing 7.5% by weight of N-methylpyrrolidinone.

The dye image receiving layer may contain ultraviolet-absorbing substances to protect the mordanted dye images from fading. For preventing discolouration of the dye image and staining of the image-background during the heat sealing the hydrophilic colloid composition of the laminate contains iodide ions, preferably applied in the form of potassium iodide, as described in published EP-A No. 0 250 657.

The production of colour photographs by the dye diffusion transfer process is a very convenient method especially for the production of identification cards containing a colour photograph of the person to be identified.

The image-receiving layer can form part of a separate image-receiving material or form an integral combination with the light-sensitive layer(s) of the photographic material.

When the image-receiving layer is applied to a common hydrophobic resin support and remains associated with the silver halide emulsion layer(s) after DTR processing of the photosensitive material, an alkali-permeable light-shielding layer, e.g. containing white pigment particles, is applied between the image-receiving layer and the underlying silver halide emulsion layer(s) to mask the negative image in the latter with respect to the positive image as described e.g. in the already mentioned book of André Rott and Edith Weyde, page 141.

In the production of a laminate according to the present invention any type of hydrophobic resin sheet support may be used.

A preferred support for use in heat sealing is made of a vinyl chloride polymer.

The term "vinyl chloride polymer" used herein includes the homopolymer, as well as any copolymer containing at least 50% by weight of vinyl chloride units and including no hydrophilic recurring units.

Vinyl chloride copolymers serving as the support may contain one or more of the following comonomers: vinylidene chloride, vinyl acetate, acrylonitrile, styrene, butadiene, chloroprene, dichlorobutadiene, vinyl fluoride, vinylidene fluoride and trifluorochloroethylene.

The polyvinyl chloride serving as the support may be chlorinated to contain 60–65% by weight of chlorine.

Many properties of polyvinyl chloride and its copolymers are improved by plasticization and their stability can be improved by stabilizers well known to those skilled in the art (see, e.g., F. W. Billmeyer, Textbook of Polymer Chemistry, Interscience Publishers, Inc., New York (1957) p. 311–315)).

The polyvinyl chloride support may contain pigments or dyes as colouring matter e.g. in an amount up to 5% by weight. An opaque white appearance may be obtained by incorporation of white pigments, e.g. titanium dioxide particles.

As described in published EP-A No. 0 065 329 and corresponding U.S. Pat. No. 4,429,032 improved anchorage of a DTR-image receiving layer to a corona-discharge treated polyvinyl chloride support has been obtained by the use in the image-receiving layer of colloidal silica in a weight ratio of from 5/1 to 2/1 with respect to a hydrophilic binder such as gelatin. Although such an image-receiving layer shows a good adherence to said support, its internal cohesion is relatively poor and is improved markedly by the self-crosslinking reaction product used according to the present invention.

Colloidal silica suited for use in an image-receiving layer present in a laminate material according to the present invention is preferably hydrated silica with an average grain diameter between 10 and 100 nm. Such silica particles are available in aqueous colloidal dispersions marketed under the commercial names "LUDOX" (trade name of E. I. du Pont de Nemours, Wilmington, Del. U.S.A.), "SYTON" (trade name of Monsanto Chemical Corporation, Boston, Mass. U.S.A.), and "KIESELSOL" (trade name of Farbenfabriken Bayer AG, Leverkusen, West-Germany). SYTON X-30 is a trade name of Monsanto Chemical Company, St. Louis, Mo., U.S.A. for a 30% by weight aqueous dispersion of silica particles having an average size of 25 nm) and KIESELSOL 300-F is a (trade name of Farbenfabriken Bayer AG, Leverkusen. West-Germany for a colloidal silica having an average particle size of 7–8 nm).

The cohesion and adherence to a vinyl chloride polymer support of a hydrophilic colloid layer is further improved by the presence of a siloxane compound corresponding to the following general formula:

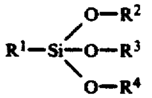

wherein: $R^1$ represents a chemical group capable of a polymerization reaction or reactive with respect to amino and/or hydroxyl groups present in proteinaceous material such as gelatin and caseine, more particularly is a group containing reactive halogen such as a reactive chlorine atom, an epoxy group or an Alpha, Beta-etylenically unsaturated group, representatives of such groups being e.g. the following:

$Cl—CH_2—CO—NH—A—$ $Br—CH_2—CO—NH—A—$

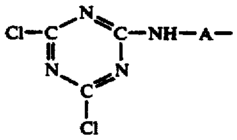

$CH_2{=}CH—SO_2—CH_2—O—CH_2—SO_2—CH_2—NH—A—$

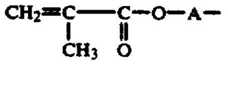

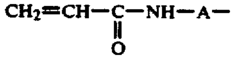

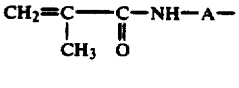

wherein A represents an alkylene group preferably a $C_1$-$C_4$ alkylene group, or $R^1$ represents a

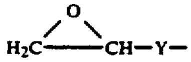

wherein Y is a bivalent hydrocarbon chain including such chain interrupted by oxygen, e.g. is a $—CH_2—O(CH_2)_3—$ group, or a bivalent hydrocarbon group that is linked at the side of the silicon atom to oxygen, e.g. is a $—CH_2—O—$ group, and each of $R^2$, $R^3$ and $R^4$ (same or different) represents a hydrocarbon group including a substituted hydrocarbon group e.g. methyl and ethyl.

Siloxane compounds according to the above general formula are described in U.S. Pat. No. 3,661,584 and GB Pat. No. 1,286,467 as compounds improving the adherence of proteinaceous colloid compositions to glass.

Examples of particularly useful siloxane compounds are listed in the following Table.

TABLE

| | |
|---|---|
| 1. | 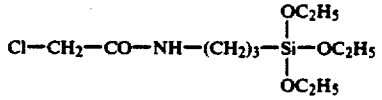 |
| 2. | 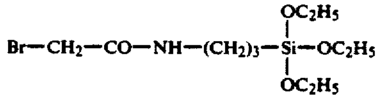 |
| 3. | 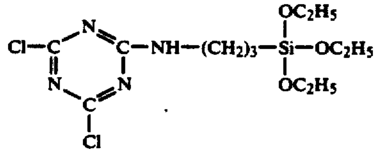 |
| 4. | 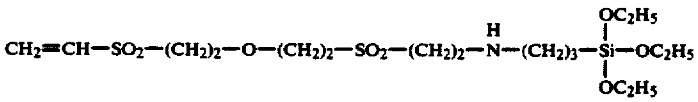 |
| 5. | 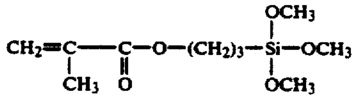 |
| 6. | 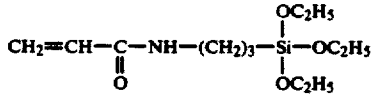 |
| 7. | 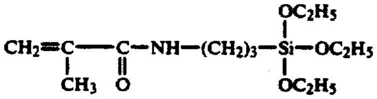 |

In order to reduce repellence on coating the hydrophilic coating composition of the hydrophilic colloid imaging layer(s) and in order to improve the coating speed the hydrophobic resin support such as vinyl chloride polymer support or a paper support coated with said polymer is pre-treated with a corona discharge by passing the support, e.g. in sheet or belt form, between a grounded conductive roller and corona wires whereto an alternating current (AC) voltage is applied with sufficiently high potential to cause ionization of the air. Preferably the applied peak voltage is in the range of 10 to 20 kV. An AC corona unit is preferred because it does not need the use of a costly rectifier unit and the necessary voltage level can be easily adapted with a transformer. In corona-discharge treatment with an an AC corona unit a frequency range from 10 to 100 kHz is particularly useful. The corona treatment can be carried out with material in the form of a belt or band at a speed of 10 to 30 m per min while operating the corona unit with a current in the range of 0.4 to 0.6 A over a belt or band width of 25 cm.

The corona-discharge treatment makes it possible to dispense with a preliminary solvent treatment for attacking and roughening the surface of the resin support and is less expensive and more refined in its application.

The resin support sheet whereon the hydrophilic colloid layer(s) containing the information to be protected is (are) coated is according to a preferred embodiment an opaque polyvinyl chloride support having a thickness of only 0.150 to 0.75 mm. A sheet of that thickness can still be manipulated easily in a mechanical printing process, e.g. offset or intaglio printing, and before or after being coated with the necessary hydrophilic colloid layer(s) for imaging purposes can receive itself or on said layer(s) security or verification marks in the form of e.g. a watermark, finger prints, printed patterns known from bank notes, coded information, e.g. binary code information, signature or other printed personal data or marks that may be applied with fluorescent pigments, nacreous pigments giving special light-reflection effects, and/or visibly legible or ultravioletlegible printing inks as described e.g. in GB Pat. No. 1,518,946 and U.S. Pat. No.4,105,333.

Other possibilities to increase security against counterfeiting are the inclusion in the laminate of a fugitive ink pattern that becomes leached out or blurred by contact with moisture if one should succeed in separating the laminate by a wet treatment.

Further security features are infrared-absorbing markings, mildly radioactive isotope patterns, magnetic dots or strips and electronic microcircuits hidden from visibility, and holograms as described, e.g., in DE-OS No. 2 639 952, GB Pat. Nos. 1,502,460 and 1,572,442 and U.S. Pat. No. 3,668,795. The holographic patterns may be obtained in silver halide emulsion layers, normally Lippmann emulsions, especially designed for that purpose and can either or not be combined with a photograph.

According to an embodiment the silver halide emulsion layer for producing the hologram is applied to one side of the transparent cover sheet used in the manufacture of a laminate according to the present invention and laminated together with the image receiving layer either directly or separated therefrom by a transparent resin intersheet made of polyethylene or a resin sheet such as a polyvinyl chloride sheet coated with polyethylene.

When the resin sheet used as support of the laminate has to possess a sufficient as required for an identification card to be inserted in a slot of an electronic identification apparatus, several sheets of matted polyvinyl chloride are stacked and laminated so as to reach a final thickness of e.g. 0.075 to 1 mm. The laminar article contains in that case preferably in the polyvinyl chloride support sheet, opacifying titanium dioxide and a suitable plasticizing agent. The support may be provided with an embossed structure.

The lamination of the basic polyvinyl chloride sheet carrying the information to other polyvinyl chloride sheets to reach the required support thickness proceeds with poor adherence when chemicals used in or resulting from the photographic processing, e.g. developing agent, are still present and soiling the sheets. Therefore, in order to obtain a better mutual adherence of polyvinyl chloride sheets a cleaning step should precede the lamination for removing these chemicals.

The cleaning proceeds preferably with the aid of a dissolved detergent that diminishes the surface tension in aqueous medium. Any commercial detergent can be used for that purpose. A survey of detergents can be found in the book: "McCutcheon's Detergents & Emulsifiers 1978 North American Edition - McCutcheon Division, MC Publishing Co. 175 Rock Road, Glen Rock, N.J. 07452 USA. Preference is given to anionic and non-ionic surface-active agents containing a polyethyleneoxide chain in their structure. Examples of such agents are described in U.S. Pat. No. 3,663,229.

A preferred surfactant for the described purpose has the following structural formula and is called hereinafter surfactant A:

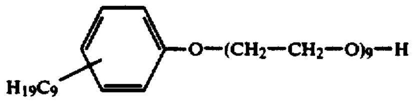

In a preferred embodiment the cleaning liquid contains also the self-cross-linking reaction product that improves in the lamination the adhesion of the information-carrying hydrophilic colloid layer(s) to the hydrophobic resin support and hydrophobic resin cover sheet.

The hydrophobic resin cover sheet consists preferably of a resin having a lower glass transition temperature (Tg) and melting temperature (Tm) than the resin present in the support sheet. According to a preferred embodiment the cover sheet is a polyethylene terephthalate resin sheet coated with a resinous melt-adhesive layer, e.g. a polyalkylene layer, preferably polyethylene layer, having a glass transition temperature at least 40° C. lower than the glass transition temperature of the resin of the support sheet of the laminar article. In this connection reference is made to the Tg values of polyethylene, polypropylene, polyvinyl chloride and polyethylene terephthalate being −20° C., +5° C, +80° C and +67° C respectively (see J. Chem. Educ., Vol. 61, No. 8. August, 1984, p. 668).

The following examples illustrate the present invention without, however, limiting it thereto.

All parts, ratios and percentages are by weight unless otherwise stated.

EXAMPLE 1

An opaque polyvinyl chloride sheet having a thickness of 200 μm was treated with an electrical discharge produced by a corona-discharge apparatus operated under the following conditions:

film-travelling speed: 20 m/min,
electrode spacing to film surface: 2 mm,
corona current: 0.55 A,
AC-voltage difference (peak value): 10 kV,
frequency: 30 kHz.

The corona-treated surface was coated with the following composition to form an image-receiving layer for silver complex diffusion transfer reversal (DTR-) processing: water: 600 ml 3% aqueous dispersion of colloidal $Ag_2S.NiS$ nuclei: 14 ml
30% aqueous dispersion of colloidal silica:
(average particle size 0.025 μm, pH: 8): 250 ml
5% solution in methanol of siloxane compound 7 of the Table: 50 ml
4% aqueous solution of formaldehyde: 10 ml
13.4% aqueous dispersion of casein: 200 ml
40% aqueous dispersion of subbing ingredient S: 100 ml
water up to: 1234 ml Said composition was applied at a wet coverage of 26 $m^2/l$ and dried.

A black-and-white photographic silver halide emulsion material was exposed to produce thereon a negative latent image (portrait and actual information) and by the common silver complex DTR-process using the above prepared image-receiving material in a tray-type processing apparatus a black-and-white silver image serving for identification purposes was produced of the latter.

After leaving the processing tray the image-receiving material with the image thereon was led through a further tray containing an aqueous solution having the following composition:

water: 750 ml
surfactant A: 50 g
reaction product R: 200 g

The treatment of the imaged image-receiving material with said liquid composition was carried out at 20° C. and lasted about 4 seconds.

Onto the thus treated and dried image-receiving layer a polyvinyl chloride sheet of 60 μm previously coated at one side with a polyethylene sheet of 30 μm was laid and laminated with the polyethylene side in contact with the image-receiving layer. Flat steel plates were used for pressing the layers together under a pressure of 10 $kg/cm^2$ at a temperature of 135° C.

Several sheets of matted polyvinyl chloride were stacked and laminated to the polyvinyl chloride support sheet so as to reach a final thickness of e.g. 0.075 to 1 mm. The polyvinyl chloride sheets used in that lamination contained opacifying titanium dioxide.

The obtained laminate had a sealing so strong that even after immersion in water for two days the sheet elements could not be peeled apart.

EXAMPLE 2

An opaque polyvinyl chloride sheet containing dispersed titanium dioxide and having a thickness of 200 μm was treated with an electrical discharge produced by a corona discharge apparatus operated under the following conditions:

sheet travelling speed: 20 m/min,
electrode spacing to sheet surface: 2 mm,
corona current: 0.55 A.
AC voltage difference (peak value): 10 kV,
frequency: 30 kHz.

The corona-treated polyvinyl chloride sheet was coated with the following composition, the quantities being expressed per m2, to produce a subbing layer:

gelatin: 0.4 g
40% aqueous dispersion of subbing ingredient S: 5 ml
5% solution in methanol of siloxane compound 7 of the Table: 2.5 ml The dried subbing layer was coated with a dye image receiving layer from the following composition, the quantities likewise being expressed per m2:

gelatin: 0.9 g
mordant M: 2.25 g

The dye image receiving sheet was processed in combination with a photographic dye diffusion transfer material as described in the Example of U.S. Pat. No. 4,496,645. Said photographic material was imagewise exposed and thereupon contacted for 1 minute with the dye image receiving material having the composition described above in a diffusion transfer apparatus COPYPROOF CP 38 (trade name of Agfa-Gevaert N.V. Belgium)) having in its tray a basic processing liquid of the following composition:

water: 800 ml
sodium hydroxide: 25 g
sodium orthophosphate: 25 g
cyclohexane dimethanol: 25 g
2,2'-methylpropylpropane diol: 25 g
N-ethylbenzene-pyridinium chloride: 0.5 g
distilled water up to: 1000 ml After leaving the processing tray the dye-imaged sheets were led through another tray containing the following aqueous composition:

water: 750 ml
surfactant A: 50 g
reaction product R: 200 g
potassium iodide: 7.5 g After drying the thus treated sheets were laminated with a transparent cover sheet being a polyethylene terephthalate sheet having a thickness of 30 μm and coated at one side with a thermoadhesive layer of polyethylene having a thickness of 30 μm. The lamination was carried out between flat steel plates pressing the polyethylene and image-bearing layers together for 5 minutes using a pressure of 10 kg/cm2 at a temperature of 135° C. Said pressure was maintained during cooling to reach room temperature (20° C.) again.

The obtained laminate had a sealing so strong that even after immersion in water for two days the sheet elements could not be peeled apart.

We claim:

1. A process for producing a laminate by bonding together two hydrophobic thermoplastic resin sheets at least one of which carries on its inner side at least one hydrophilic colloid layer bearing a photograph and/or other information, said process comprising the steps of:
(1) treating such information-bearing hydrophilic colloid layer with an aqueous composition containing a self-cross-linkable reaction product of:
(i) an epihalohydrin or an Alpha-dihalohydrin,
(ii) a water-soluble polyamide, and
(iii) a water-soluble polyamine containing at least two nitrogen atoms separated by at least three carbon atoms and optionally also by at least one oxygen or sulphur atom and having at least two different nitrogen atoms each having at least one hydrogen atom attached thereto
(2) drying thus treated layer, and
(3) applying heat and pressure to bond the hydrophobic resin sheets together with the treated hydrophilic colloid layer sandwiched there, between and concurrently carry out crosslinking of said reaction product.

2. A process according to claim 1, wherein the epihalohydrin (i) is epichlorohydrin.

3. A process according to claim 1, wherein the water-soluble polyamide (ii) is selected from the group consisting of reaction products of saturated aliphatic $C_4$–$C_{10}$-dicarboxylic acids, or their anhydrides or esters, with aliphatic polyamines containing at least two primary amino groups and at least one secondary or tertiary amino group.

4. A process according to claim 1, wherein the water-soluble polyamine (iii) is methyl-bis-(3-amino-propyl)-amine.

5. A process according to claim 1, wherein said aqueous composition contains said self-cross-linkable reaction product in an amount of 10 g/l to 160 g/l.

6. A process according to claim 1, wherein heat for bonding said sheet is applied at a temperature in the range of 100° to 150° C., and pressure is applied in the range of 5 to 20 kg/cm2.

7. A process according to claim 1, wherein one of the thermoplastic resin sheets carrying a colloid layer is made of a vinyl chloride polymer.

8. A process according to claim 1, wherein at least one of said hydrophilic colloid layers is an imagewise exposed, photographically developed and fixed silver halide emulsion layer or is an image-receiving layer containing a photographic image obtained by the silver complex diffusion transfer reversal process or a dye diffusion transfer process based on silver halide photography.

9. A process according to claim 1, wherein each such hydrophilic colloid layer contains gelatin.

10. A process according to claim 1, wherein one of said resin sheets is a polyvinyl chloride sheet carrying such hydrophilic colloid layer and the other of said resin sheets is a polyethylene terephthalate sheet coated with a polyethylene layer which is bonded to said hydrophilic colloid layer(s).

11. A process according to claim 1, wherein in said hydrophilic colloid layer a siloxane compound is present corresponding to the following general formula:

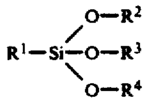

wherein:

$R^1$ represents a chemical group capable cf a polymerization reaction or reactive with respect to amino and/or hydroxyl groups present in proteinaceous material, and each of $R^2$, $R^3$ and R4 which may be the same or different represents a hydrocarbon group.

* * * * *

UNITED STATES PATENT AND TRADEMARK OFFICE

CERTIFICATE OF CORRECTION

PATENT NO. : 4,992,130

DATED : 2/12/91

INVENTOR(S) : Leon L. Vermeulen, et al

It is certified that error appears in the above-identified patent and that said Letters Patent is hereby corrected as shown below:

Column 14, claim 6, line 51, change "sheet" to --sheet--.

Signed and Sealed this

Thirtieth Day of June, 1992

*Attest:*

DOUGLAS B. COMER

*Attesting Officer*

*Acting Commissioner of Patents and Trademarks*

UNITED STATES PATENT AND TRADEMARK OFFICE

CERTIFICATE OF CORRECTION

PATENT NO. : 4,992,130

DATED : February 12, 1991

INVENTOR(S) : Vermeulen, et al

It is certified that error appears in the above-identified patent and that said Letters Patent is hereby corrected as shown below:

Col. 14, claim 6, line 51, change "sheet" to --sheets--.

Col. 15, claim 10, line 6, change "layer(s)" to --layer--.

This certificate supersedes Certificate of Correction issued June 13, 1992

Signed and Sealed this

Twenty-second Day of June, 1993

Attest:

Michael K. Kirk

MICHAEL K. KIRK

*Attesting Officer*

*Acting Commissioner of Patents and Trademarks*